United States Patent
Trindle

[15] 3,679,188
[45] July 25, 1972

[54] WELD-ON TYPE LEAF SPRING BRACKET ASSEMBLY AND METHOD

[72] Inventor: Terry LaVern Trindle, Edwardsburg, Mich.

[73] Assignee: Kelsey-Hayes Company, Romulus, Mich.
[22] Filed: Dec. 7, 1970
[21] Appl. No.: 95,605

[52] U.S. Cl. ............................................................ 267/52
[51] Int. Cl. .......................................................... F16f 1/28
[58] Field of Search ............................................. 267/52

[56] References Cited

UNITED STATES PATENTS

| 3,591,197 | 7/1971 | Haley | 267/52 |
| 3,602,523 | 8/1971 | Poulos | 267/52 |

Primary Examiner—James B. Marbert
Attorney—Harness, Dickey & Pierce

[57] ABSTRACT

A weld-on leaf spring bracket assembly comprising a leaf spring, bracket means for holding the leaf spring, and an axle to which the bracket means is welded, with the leaf spring being compressively secured within the bracket means by suitable means such as welding or the like; and, the method technique of constructing the assembly.

14 Claims, 5 Drawing Figures

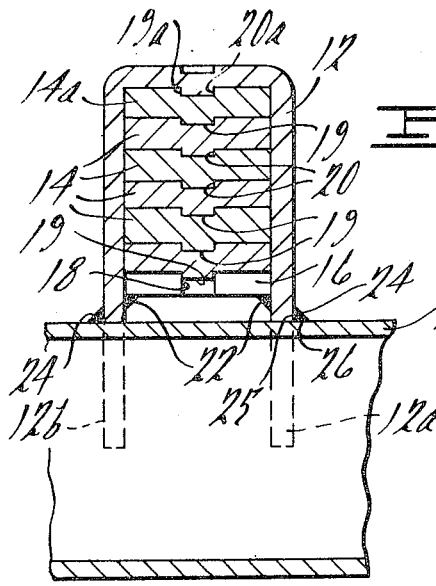
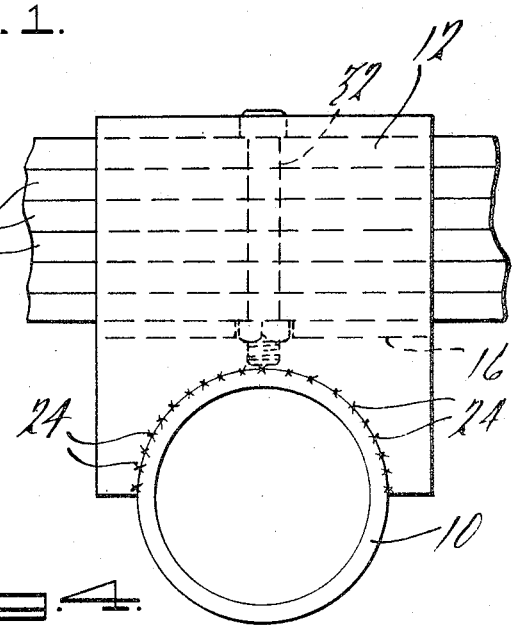
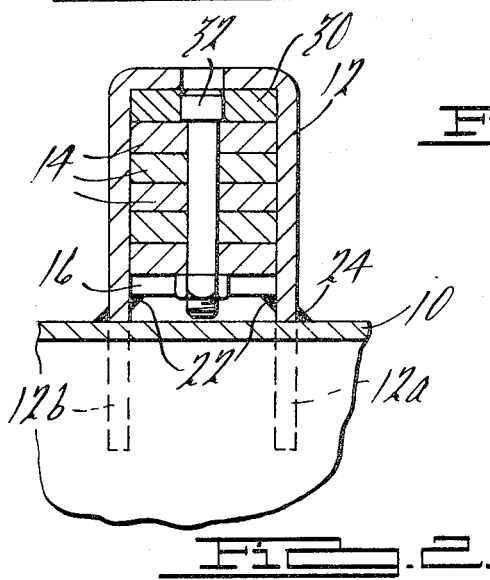
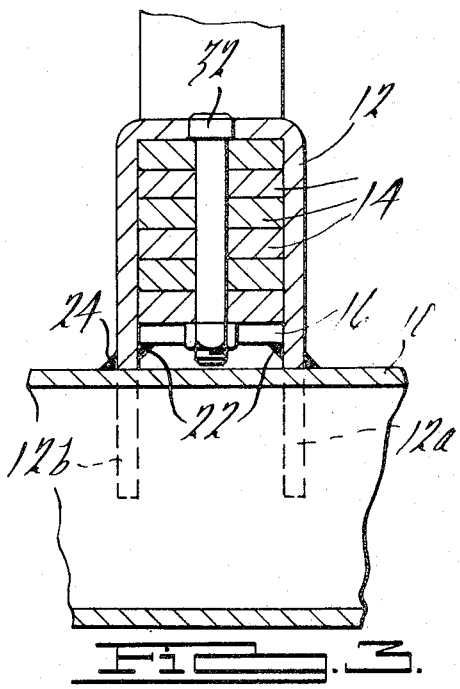
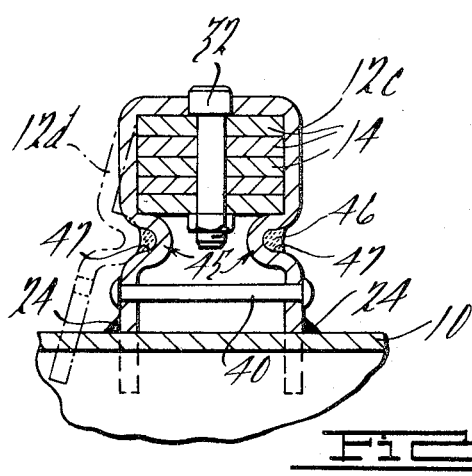
INVENTOR.
Terry L. Trindle

WELD-ON TYPE LEAF SPRING BRACKET ASSEMBLY AND METHOD

BACKGROUND OF THE INVENTION

This invention broadly relates to a weld-on spring bracket assembly. More particularly, this invention relates to a new construction of leaf spring, bracket, and axle assembly wherein the leaf spring is compressively secured within the bracket and held in place by a compression plate which is welded to the bracket after the leaf spring is compressively positioned therein, and with the bracket subsequently being attached to the axle by welding.

The design of the assembly of the invention as disclosed herein eliminates the need for numerous parts, such as U-bolts, tie plates, and attaching nuts, which were required in prior leaf spring bracket assemblies.

Furthermore, this invention involves a novel method of construction, which due to the particular structure of the parts of the assembly is greatly simplified in comparison with prior methods of constructing leaf spring bracket axle assemblies. The method of constructing a weld-on spring bracket assembly as disclosed herein has been found to be considerably more economical in comparison with prior methods and, it has been found that the method herein eliminates several labor personnel from assembly line production while at the same time the method herein increases the speed and efficiency of the preparation of the assembly when compared with prior art constructions.

The following references which were developed through a preliminary examination are cited here of record: U.S. Pat. Nos. 1,852,132 (Sieprath); 2,026,404 (Strandberg et al.); 2,077,048 (Konetsky); 2,253,255 (Weber); 2,663,571 (Romick); 3,378,250 (Marti); 3,494,609 (Harbers); and German Pat. No. 1,219,813 (Schomacker).

The invention as disclosed herein is particularly applicable to leaf spring, bracket and axle assemblies on mobile homes and travel trailers. However, it is to be understood that the invention is also applicable to numerous other types of axle constructions. The term axle herein is used in its broadest sense and includes non-driven axles, driven axles, and axle housings.

The object of this invention is to provide novel weld-on spring bracket assembly and novel method of constructing same.

Another object of the present invention is to provide an assembly wherein a spring bracket is adapted to be welded to an axle through the use of welding means for compressively securing the leaf springs within the bracket through the use of an intermediate compression plate.

Another object of the present invention is to provide an assembly wherein longitudinal creep of the individual leaves of the assembly is prevented through the use of a series of leaf location nibs.

Other objects, features and advantages of the present invention will become apparent from the subsequent description and the appended claims taken in conjunction with the accompanying drawings.

BRIEF DESCRIPTION OF THE DRAWINGS

FIG. 1 illustrates a weld-on spring bracket assembly in accordance with one embodiment of the invention herein set forth;

FIG. 2 illustrates another embodiment of the asSembly of this invention wherein a spacer member is shown at the top inside part of the bracket;

FIG. 3 illustrates another embodiment of the assembly of this invention which does not utilize a spacer member at the top inside part of the bracket;

FIG. 4 illustrates a side view of FIG. 3 and in particular FIG. 4 illustrates the curved surface portion of the bracket about which the welding is made in order to secure the bracket to the axle; and FIG. 5 illustrates another embodiment of the assembly of the invention wherein inwardly projecting protrusions in the sides of the bracket are used to support the leaf springs.

SUMMARY OF THE INVENTION

Briefly stated, the present invention comprises a weld-on spring bracket assembly comprising spring means of a leaf type; bracket means for holding the spring means; axle means in contact with the bracket means; positional contact area means on the bracket means and on the axle means generally close to each other for providing a predetermined location at which the axle means and the bracket means can be welded together; weld means for securing the axle means and the bracket means together at said contact area means such that the spring means are secured within the bracket means which in turn is secured to the axle means.

From a method aspect, briefly stated, the present invention comprises a method of preparing an assembly for use as a weld-on spring bracket assembly, comprised of the steps of (a) compressively securing spring means of a leaf type to a bracket means for holding the spring means, (b) generally simultaneously maintaining the spring means in a compressed condition and securing same within the bracket means by welding, and (c) welding the bracket means to an axle.

DESCRIPTION OF PREFERRED EMBODIMENTS

A description of the invention with reference to the drawings is now made, however, it is not intended that the invention should be limited by this description.

FIG. 1 shows by simplified plan view and cross section a typical axle 10 used on a mobile home or travel trailer. Attached to the axle 10 is a U-shaped cross section bracket 12 which holds therewithin a plurality of leaf springs 14 shown in cross section, and at the bottom of the leaf springs is shown a compression plate 16. The compression plate 16 contains a dimple or nib receiving aperture 18 which cooperatively receives and holds the nib 19 of the leaf spring immediately above the compression plate. Each of the remaining leaf springs above the compression plate 16 also include a projecting nib 19 and, these nibs designated 19 fit into and mate with a corresponding nib receiving depression designated 20 on the immediately adjacent lower compression plate. The top compression plate designated 14a within the bracket 12 has its nib receiving depression 20a in mating relationship with the nib 19a formed at the top of the bracket 12 such that the top leaf spring 14a is held fixed relative to the bracket 12.

It has been discovered that the nib means 19 are not only simple of construction but very satisfactory and advantageous in preventing longitudinal creep of the individual leaves of the assembly, that is, the series of nibs act to maintain proper leaf location in a very satisfactory manner.

The compression plate 16 in FIG. 1 is compressively secured into position during the construction of the assembly shown in FIG. 1, for example by clamping or pressing the leaf springs and compression plate 16 such that they are tightly positioned within the bracket 12; and, at the same time a certain amount of clamping or pressing may be exerted against the sides 12a and 12b of the bracket to compress same against the sides of the leaves 14 and the sides of the compression plate 16.

It is to be understood, however, that rather than clamping or pressing the sides 12a and 12b of the bracket such that they are in tight fitting relationship with the sides of the leaf springs 14, a small space or loose fit between the leaf springs 14 and the bracket sides 12a and 12b may be preferred in some applications. This enables rotational adjustment of the leaf springs 14 relative to the bracket 12 by rotation about the vertical axis of the leaf location nibs 19, or the axis of the tie bolt 32. Such rotational adjustment in many instances facilitates mounting of the final assembly on a mobile home or travel trailer.

The weld designated 22 is applied at each side of the compression plate to fixedly secure same to the bracket 12. In this manner the leaves 14 are compressively secured within the bracket 12 by the compression plate 16 which is welded into position by the welds 22. Subsequently the assembled leaf springs and bracket are positioned on the axle 10 and the bracket 12 is then secured to the axle 10 by the weldings designated 24. Relative to the welding 24 the area of contact designated 25 on the bracket 12 and the area of contact 26 on the axle 10 constitute positional contact areas which provide a predetermined location at which the axle means and the bracket means can be welded together.

FIG. 2 illustrates an embodiment of the invention similar to FIG. 1, but in FIG. 2 a spacer member designated 30 is positioned at the inside top part of the bracket 12 and the purpose of the spacer member is to enable the maintaining of a standard height for the mounted leaf spring bracket assembly relative to the eye bolts (not shown) at each end of the leaf spring used for mounting of the assembly to the underside chassis, for example, of a mobile home. Also shown in FIG. 2 is a tie bolt 32 which is utilized for longitudinal leaf location as opposed to the leaf location nibs 19 utilized in the illustration of FIG. 1. Furthermore, the tie bolt can be torqued up, that is used to compressively secure the leaves 14 together prior to welding of leaves 14 within the bracket 12.

FIG. 3 illustrates another embodiment of the invention similar to that of FIG. 2 except that in FIG. 3 six spring leaves are used rather than the five spring leaves and a spacer member 30 per the embodiment shown in FIG. 2. Thus, for example, the six spring leaf embodiment of FIG. 3 will provide a more heavy duty spring arrangement than would the five leaf spring embodiment of FIG. 2 which includes a spacer member at the top thereof, however, both the spring assembly of FIG. 2 and the spring assembly of FIG. 3 would possess a standard height for mounting relative to the eye bolt connections of either spring assembly to the underside chassis of a mobile home or travel trailer.

FIG. 4 illustrates a side view of FIG. 3 and in particular FIG. 4 illustrates the curved surface portion of the bracket 12 about which the welding 24 is made in order to secure the bracket 12 to the axle.

FIG. 5 embodiment shows a bracket designated 12c and tie bolt means designated 32 which could alternatively be longitudinal leaf location means such as the nibs shown in FIG. 1. Also in FIG. 5 there is illustrated welded bolt or rivet means 40 and weld means 24 for securing the bracket to the axle 10.

The bracket in FIG. 5 is also shown partly in phantom as designated 12d indicating that the bracket 12c before having the spring leaves installed therein is formed in an expanded manner such that after the leaves are assembled and put within the bracket then the bracket 12c can be compressed to tightly hold the spring leaves 14 within the bracket 12c. The clamping together of the bracket 12c operates to deform or bend it into its final shape as shown in FIG. 5.

Also it will be seen in FIG. 5 that there are indentations or protrusions designated 45 formed in the sides of the bracket 12c and the spring leaves 14 butt up against and are held within the clamped bracket 12c due to the supporting action of the indentations 45.

Lastly, a support weld or spacer member 46 can be welded in place on the female side 47 of the indentation 45 in order to provide additional support for the load caused by the leaf springs 14 on the bracket 12c.

While it will be apparent that the preferred embodiments of the invention disclosed are well calculated to fulfill the objects above stated it will be appreciated that the invention is susceptible to modification, variation and change without departing from the proper scope or fair meaning of the subjoined claims.

What is claimed is:

1. A weld-on spring bracket assembly comprising:
   spring means of a leaf type;
   bracket means for holding the spring means;
   axle means in contact with the bracket means;
   positional contact area means on the bracket means and on the axle means generally close to each other for providing a predetermined location at which the axle means and the bracket means can be welded together;
   weld means for securing the axle means and the bracket means together at said contact area means such that the spring means are secured within the bracket means which in turn is secured to the axle means,
   said spring means are compressively positioned in the bracket means and held in place by
   compression plate means which are welded to the bracket means such that the spring means are compressively secured to the bracket means.

2. The assembly of claim 1 wherein,
   nib means are positioned in cooperative fashion in a plurality of the leaves of the spring means to hold one leaf in fixed position relative to another leaf.

3. The assembly of claim 1, wherein,
   means protruding from inside of the bracket means are used to at least partially support the leaf type spring means within the bracket means.

4. The assembly of claim 3, wherein,
   said protruding means are formed by inwardly projecting U-shaped slots in sides of the bracket means.

5. The assembly of claim 1 wherein
   clearance is maintained between the spring means and interior side walls of the bracket means to thereby enable rotational adjustment of the spring means relative to the bracket means.

6. A weld-on spring bracket assembly comprising:
   spring means of a leaf type;
   bracket means for holding the spring means;
   axle means in contact with the bracket means;
   positional contact area means on the bracket means and on the axle means generally close to each other for providing a predetermined location at which the axle means and the bracket means can be welded together;
   weld means for securing the axle means and the bracket means together at said contact area means such that the spring means are secured within the bracket means which in turn is secured to the axle means,
   wherein, the assembly further includes,
   compression plate means operable to compressively secure the spring means within the bracket means.

7. A method of preparing an assembly for use as a weld-on spring bracket assembly, comprised of the steps of:
   a. compressively securing spring means of a leaf type to a bracket means for holding the spring means,
   b. generally simultaneously maintaining the spring means in a compressed condition and securing same within the bracket means by welding, and
   c. welding the bracket means to an axle.

8. The method of claim 7, wherein,
   nib means are positioned in cooperative fashion in a plurality of the leaves of the spring means to hold one leaf in fixed position relative to another leaf.

9. The method of claim 7, wherein,
   a compression plate means is used in compressively securing the spring means to the bracket means.

10. The method of claim 9, wherein,
    said bracket means are U-shaped and have twin curved surface portions which form the contact area means.

11. The method of claim 7 further characterized as including
    nib means which are positioned in cooperative fashion in a plurality of the leaves of the spring means to hold one leaf in fixed position relative to another leaf.

12. The method of claim 7, wherein,
    there are formed means protruding from inside of the bracket means for use in at least partially supporting the leaf type spring means within the bracket means.

13. The method of claim 12, wherein,
    said protruding means are formed by inwardly projecting U-shaped slots in sides of the bracket means.

14. The method of claim 9 further characterized as including the step of
    rotationally adjusting the spring means relative to the bracket means to obtain desired alignment of the assembly.

* * * * *